United States Patent
Song

(10) Patent No.: US 11,358,427 B2
(45) Date of Patent: Jun. 14, 2022

(54) SUSPENSION FOR VEHICLE

(71) Applicant: Hyundai Mobis Co., Ltd., Seoul (KR)

(72) Inventor: Woo Bin Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 227 days.

(21) Appl. No.: 16/731,920

(22) Filed: Dec. 31, 2019

(65) Prior Publication Data

US 2020/0207172 A1 Jul. 2, 2020

(30) Foreign Application Priority Data

Jan. 2, 2019 (KR) .................. 10-2019-0000101

(51) Int. Cl.
*B60G 13/00* (2006.01)
*B60G 15/06* (2006.01)

(52) U.S. Cl.
CPC ............ *B60G 13/00* (2013.01); *B60G 15/062* (2013.01); *B60G 15/068* (2013.01); *B60G 2204/41* (2013.01)

(58) Field of Classification Search
CPC .... B60G 15/068; B60G 13/00; B60G 15/062; B60G 2204/41; F16F 9/3242; F15B 15/1442; F15B 15/1438; F15B 15/1461
See application file for complete search history.

(56) References Cited

U.S. PATENT DOCUMENTS

| | | | | | |
|---|---|---|---|---|---|
| 3,995,461 | A | * | 12/1976 | Hudson | ............... B60B 7/068 70/225 |
| 2006/0054436 | A1 | * | 3/2006 | Handke | ............ B60G 15/067 188/321.11 |

FOREIGN PATENT DOCUMENTS

| | | | | | |
|---|---|---|---|---|---|
| CN | 102555719 | A | * | 7/2012 | |
| CN | 209146213 | U | * | 7/2019 | |
| EP | 1747916 | A1 | * | 1/2007 | ........... B60G 15/068 |
| JP | 08159201 | A | * | 6/1996 | |
| JP | 2002019441 | A | * | 1/2002 | ........... B60G 15/068 |
| KR | 20000004008 | A | * | 1/2000 | |
| KR | 20090036212 | A | * | 4/2009 | ........... B60G 15/068 |
| KR | 20120029922 | A | * | 3/2012 | |
| KR | 20160085595 | A | * | 7/2016 | |
| KR | 20160105070 | A | * | 9/2016 | |
| KR | 20160150356 | A | * | 12/2016 | |
| KR | 20170097323 | A | * | 8/2017 | |

(Continued)

OTHER PUBLICATIONS

Song, Suspention Apparatus of Vehicle, Sep. 6, 2016, EPO, KR 20160105070 A, Machine Translation of Description (Year: 2016).*

(Continued)

*Primary Examiner* — Paul N Dickson
*Assistant Examiner* — Matthew D Lee
(74) *Attorney, Agent, or Firm* — H.C. Park & Associates, PLC

(57) ABSTRACT

A suspension for a vehicle including a strut tube; a strut rod installed so as to be movable in the strut tube; an insulator part through which an upper end of the strut rod is installed, and which includes a lower cup, an insulator body and an upper cup; and a cap member coupled to the upper cup so as to prevent penetration of foreign matters, and having a coupling structure coupled to the upper end of the strut rod. An anti-rotation structure for preventing rotation of the cap member may be provided in the cap member and the upper cup.

10 Claims, 5 Drawing Sheets

(56) References Cited

FOREIGN PATENT DOCUMENTS

WO    WO-2010140646 A1 * 12/2010 ........... B60G 15/068

OTHER PUBLICATIONS

Noma , Installing Structure of Dust Sealing Cap, Jun. 21, 1996, EPO, JP H08159201 A, Machine Translation of Description (Year: 1996).*

Hyung , Upper Mounting Structure of a Shock Absorber, Apr. 14, 2009, EPO, KR 20090036212 A, Machine Translation of Description (Year: 2009).*

* cited by examiner

SUSPENSION FOR VEHICLE

CROSS-REFERENCES TO RELATED APPLICATION

This application claims priority from and the benefit of Korean Patent Application No. 10-2019-0000101, filed on Jan. 2, 2019, which is incorporated by reference for all purposes as if set forth herein.

BACKGROUND

Field

Exemplary embodiments relate to a suspension for a vehicle, and more particularly, to a suspension for a vehicle, which includes a coupling structure formed in a cap member and coupled to an upper end of a strut rod, and anti-rotation and anti-separation structures formed in an upper cup and a cap member, and thus can improve a coupling force of the cap member and prevent rotation and separation of the cap member.

Discussion of the Background

In general, a vehicle has a suspension installed therein to buffer vibration or shock transferred from a wheel. Such a suspension is a buffer device that absorbs shock or vibration applied to an axle from the road while the vehicle travels. The suspension includes a strut tube installed at the wheel and a strut rod installed at a vehicle body so as to be movable upward/downward in the strut tube.

The strut rod has an upper end portion coupled to an insulator device that fixes the strut rod to the vehicle body. The insulator device includes an insulator body, an upper cup and a lower cup. The upper cup and the lower cup are made of steel to maintain predetermined hardness. The upper cup and the lower cup are forced into a through-hole of the insulator body. Each of the upper and lower cups has a through-hole formed in the center thereof. The upper end portion of the strut rod is inserted into the through-hole, and a screw is fastened to the upper end portion of the strut rod. The upper cup has a cap member installed thereon to protect the strut rod from foreign matters.

In the related art, the cap member assembled to the upper cup may be easily separated. Thus, foreign matters may be introduced into the strut rod, and thus degrade the function of the suspension. Therefore, there is a need for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to a suspension for a vehicle, which includes a coupling structure formed in a cap member and coupled to an upper end of a strut rod, and anti-rotation and anti-separation structures formed in an upper cup and a cap member, and thus can improve a coupling force of the cap member and prevent rotation and separation of the cap member.

In an exemplary embodiment, a suspension for a vehicle may include: a strut tube; a strut rod installed so as to be movable in the strut tube; an insulator part through which an upper end of the strut rod is installed, and which includes a lower cup, an insulator body and an upper cup; and a cap member coupled to the upper cup so as to prevent penetration of foreign matters, and having a coupling structure coupled to the upper end of the strut rod. An anti-rotation structure for preventing rotation of the cap member may be provided in the cap member and the upper cup.

The coupling structure may include a plurality of fixed pieces which are formed in a cylindrical coupling part formed in an inner central portion of the cap member, and pressurize and fix the circumference of the upper end of the strut rod, and the circumference of the upper end of the strut rod may be forcibly coupled between the fixed pieces.

The plurality of fixed pieces may be disposed on the circumference of a concentric circle, and arranged at even intervals.

A groove formed by the plurality of fixed pieces may have a smaller radius than that of the strut rod.

The anti-rotation structure may include one or more fixed grooves formed in the upper cup and one or more fixed protrusions formed in the cap member.

The cap member and the upper cup may have an anti-separation structure for preventing separation of the cap member.

In another exemplary embodiment, a suspension for a vehicle may include: a strut tube; a strut rod installed so as to be movable in the strut tube; an insulator part through which an upper end of the strut rod is installed, and which includes a lower cup, an insulator body and an upper cup; and a cap member coupled to the upper cup so as to prevent penetration of foreign matters, and having a coupling structure coupled to the upper end of the strut rod. The cap member and the upper cup may have an anti-separation structure for preventing separation of the cap member.

The coupling structure may include a plurality of fixed pieces which are formed in a cylindrical coupling part formed in an inner central portion of the cap member, and pressurize and fix the circumference of the upper end of the strut rod, and the circumference of the upper end of the strut rod may be forcibly coupled between the fixed pieces.

The plurality of fixed pieces may be disposed on the circumference of a concentric circle, and arranged at even intervals.

A groove formed by the plurality of fixed pieces may have a smaller radius than that of the strut rod.

The anti-separation structure may include a first crease structure formed in a ring-shape in the upper cup and a second crease structure formed on the outer surface of the coupling part and coupled to the first crease structure.

The cap member and the upper cup may have an anti-rotation structure for preventing rotation of the cap member. The anti-rotation structure may include one or more fixed grooves formed in the upper cup and one or more fixed protrusions formed in the cap member.

In accordance with the above-described embodiment of the present disclosure, the coupling structure coupled to the upper end of the strut rod may be formed in the cap member, which makes it possible to improve the coupling force of the cap member.

Furthermore, the anti-rotation structure may be formed in the upper cup and the cap member, which makes it possible to prevent the rotation of the cap member.

Furthermore, the anti-separation structure may be formed in the upper cup and the cap member, which makes it possible to prevent the separation of the cap member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
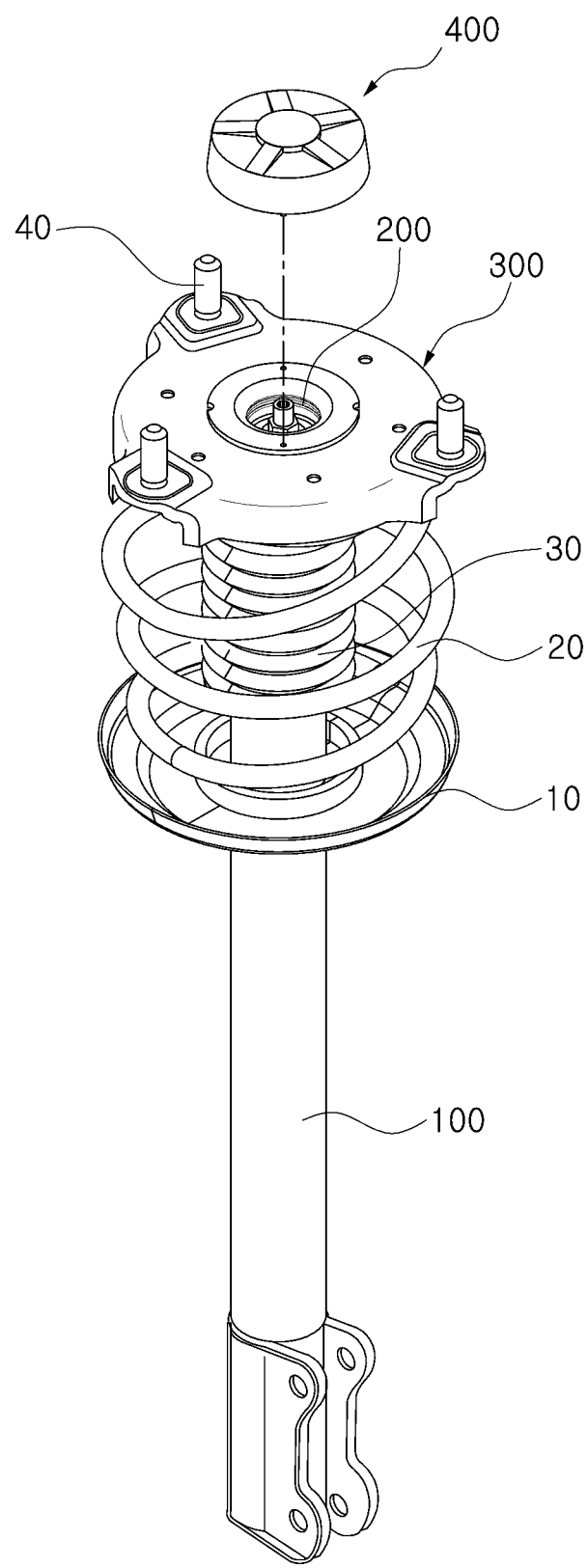
FIG. 1 is a diagram illustrating a suspension for a vehicle in accordance with an embodiment of the present disclosure, showing that a cap member is not coupled.

Hereafter, a suspension for a vehicle in accordance with exemplary embodiments of the present invention will be described in detail with reference to the accompanying drawings. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
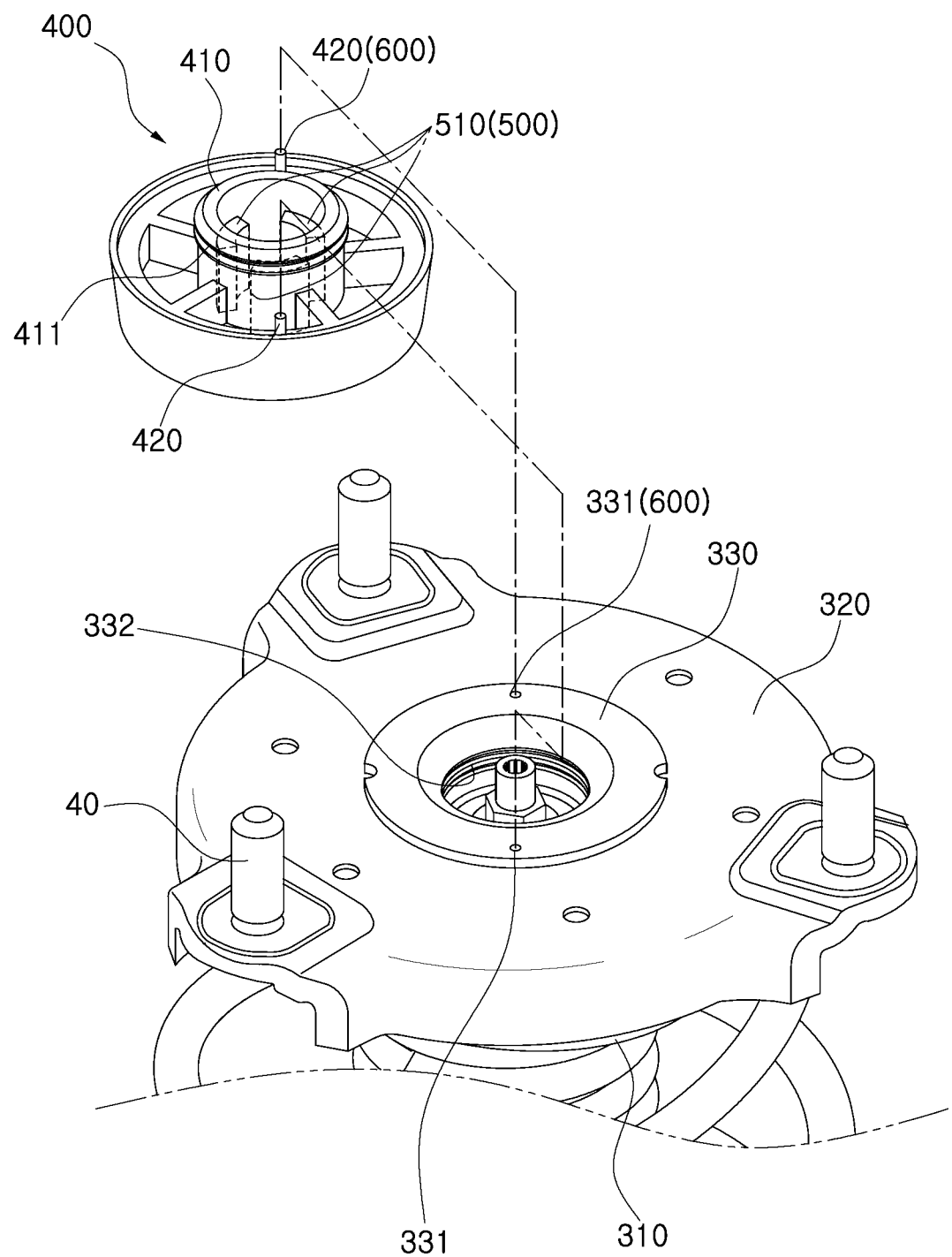
FIG. 2 is a perspective view illustrating a coupling structure of the cap member applied to the suspension for a vehicle in accordance with the embodiment of the present disclosure.
Figure 3:
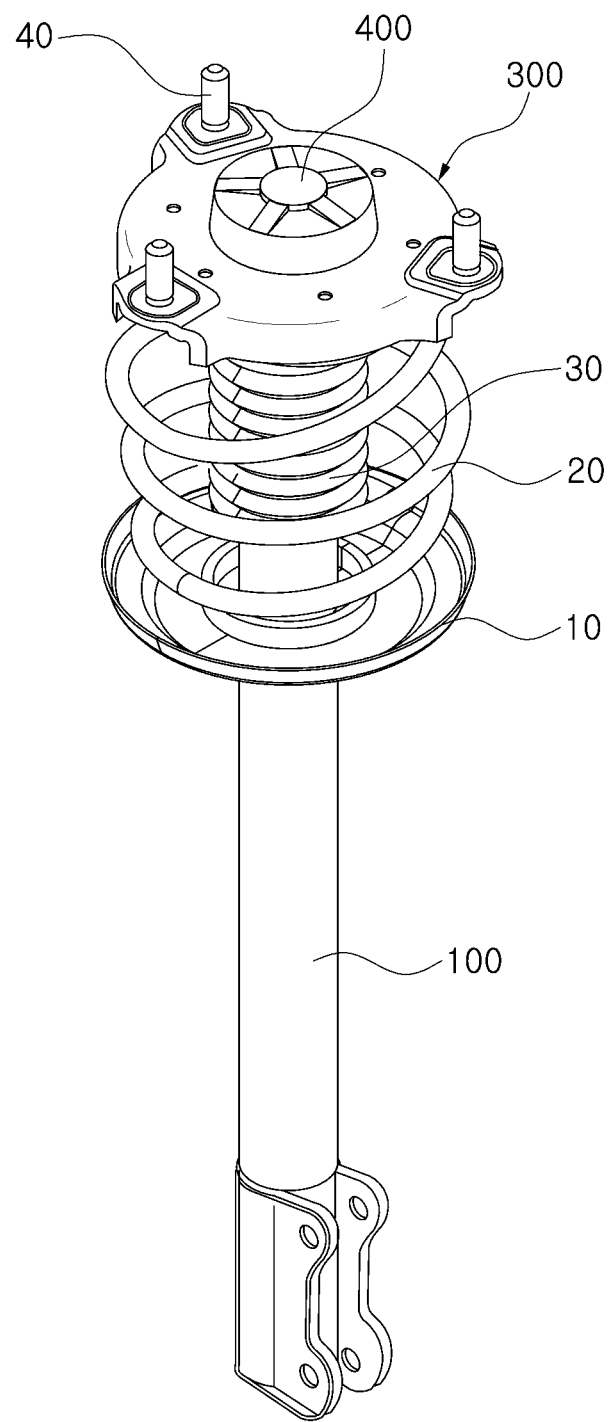
FIG. 3 is a diagram illustrating the suspension for a vehicle in accordance with the embodiment of the present disclosure, showing that the cap member is coupled.
Figure 4:
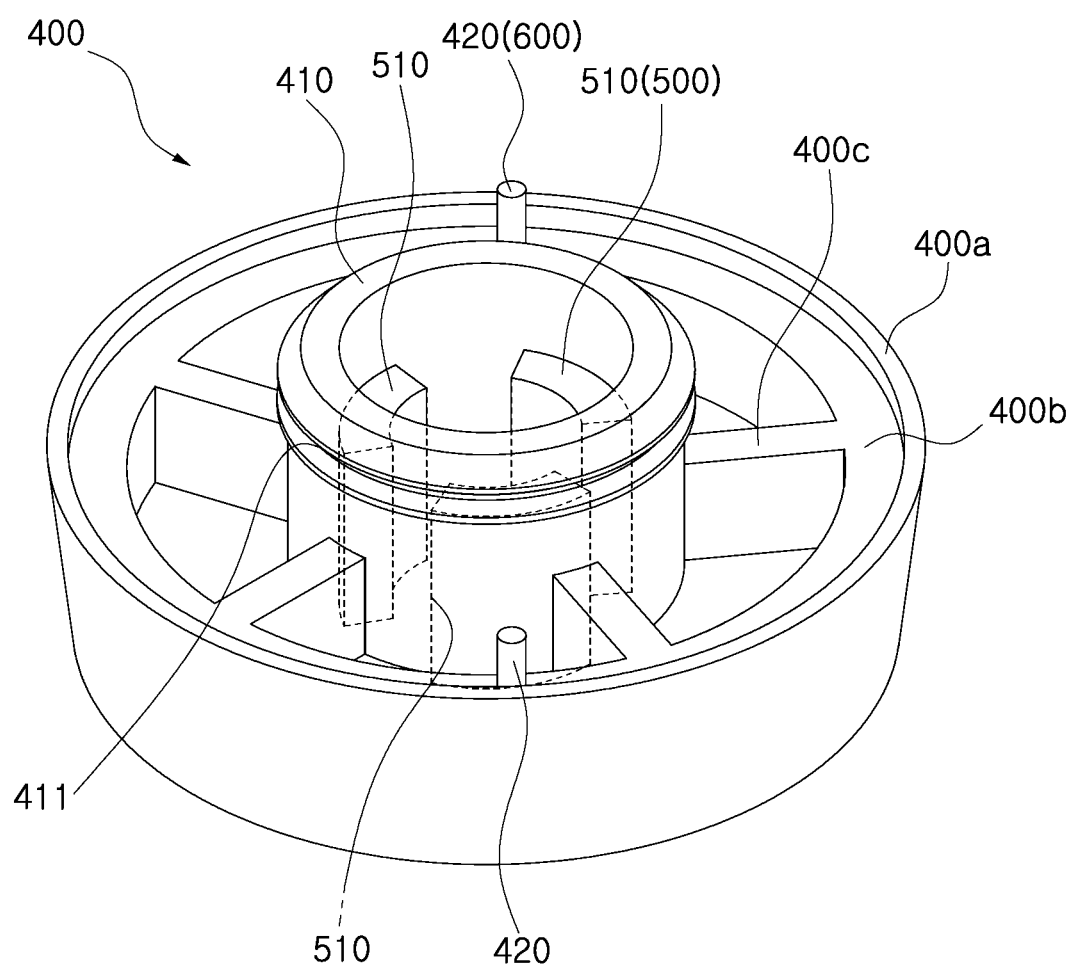
FIG. 4 is a diagram illustrating the cap member applied to the suspension for a vehicle in accordance with the embodiment of the present disclosure.
Figure 5:
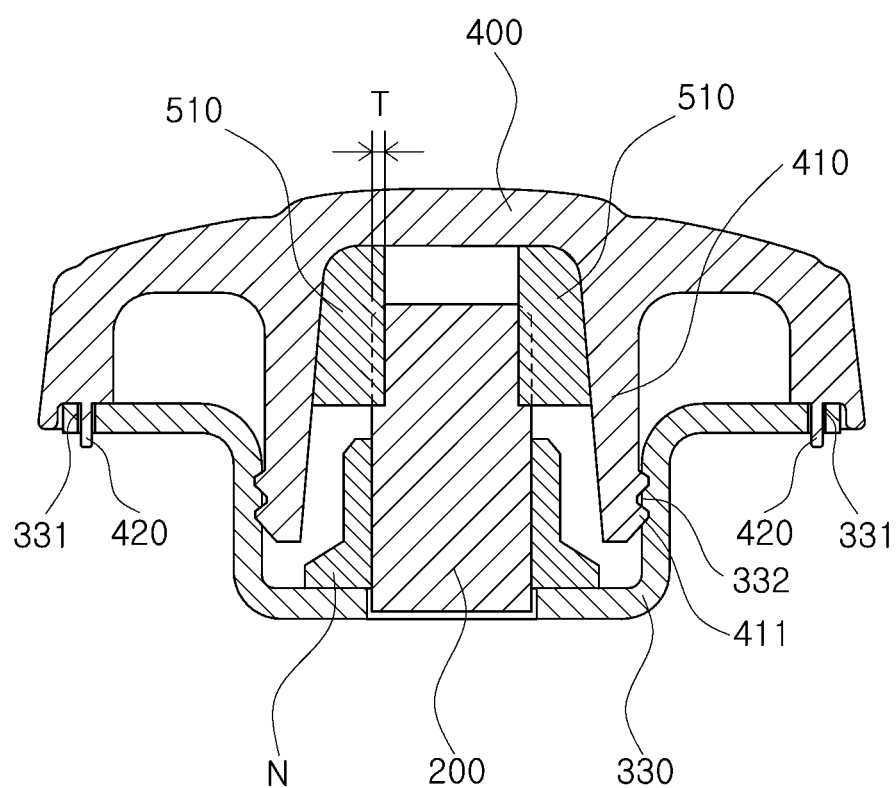
FIG. 5 is a cross-sectional view illustrating the coupling structure of the cap member applied to the suspension for a vehicle in accordance with the embodiment of the present disclosure.

FIG. 1 is a diagram illustrating a suspension for a vehicle in accordance with an embodiment of the present disclosure, showing that a cap member is not coupled, FIG. 2 is a perspective view illustrating a coupling structure of the cap member applied to the suspension for a vehicle in accordance with the embodiment of the present disclosure, FIG. 3 is a diagram illustrating the suspension for a vehicle in accordance with the embodiment of the present disclosure, showing that the cap member is coupled, FIG. 4 is a diagram illustrating the cap member applied to the suspension for a vehicle in accordance with the embodiment of the present disclosure, and FIG. 5 is a cross-sectional view illustrating the coupling structure of the cap member applied to the suspension for a vehicle in accordance with the embodiment of the present disclosure.

Referring to FIGS. 1 to 5, the suspension for a vehicle in accordance with the embodiment of the present disclosure connects a wheel and a vehicle body which are not illustrated.

The suspension for a vehicle includes a strut tube 100, a strut rod 200, an insulator part 300 and a cap member 400.

The strut tube 100 is installed at the wheel. The strut rod 200 is installed at the vehicle body so as to be movable upward/downward within the strut tube 100.

The insulator part 300 includes a lower cup 310, an insulator body 320 and an upper cup 330. The strut rod 200 has an upper end installed through the insulator part 300.

The cap member 400 is coupled to the insulator part 300 or specifically the upper cup 330, and serves to prevent penetration of foreign matters. The cap member 400 has a coupling structure 500 coupled to the upper end of the strut rod 200.

The strut tube 100 is filled with oil for generating hydraulic pressure, and the insulator part 300 is installed at the upper end of the strut rod 200. A lower end of the strut rod 200 is inserted into the strut tube 100.

The strut rod 200 has a dust cover 30 installed therearound to prevent foreign matters such as dust from penetrating between the strut tube 100 and the strut rod 200.

The strut tube 100 has a lower spring seat 10 installed on the outer circumferential surface thereof, the strut rod 200 has an upper spring seat (not illustrated) installed on the outer circumferential surface thereof, and a spring 20 is installed between the lower spring seat 10 and the upper spring seat.

Vibration generated from the wheel and road shock applied to the wheel are absorbed by hydraulic pressure within the strut tube 100 and elastic deformation of the spring 20, which occurs when the strut rod 200 is inserted into the strut tube 100.

The insulator part 300 includes the lower cup 310 and the upper cup 330 to which the upper end of the strut rod 200 are coupled. The insulator body 320 is disposed between the lower cup 310 and the upper cup 330.

The insulator body 320 is coupled to the lower cup 310 and the upper cup 330, and a coupling nut N installed at an end of the strut rod 200 fixes the insulator body 320, the lower cup 310, the upper cup 330 and the strut rod 200.

The insulator body 320 is filled with insulator resin, and has a bolt coupling hole (not illustrated) formed at the top surface thereof such that a bolt 40 to be fastened to the vehicle body is coupled to the bolt coupling hole.

As illustrated in FIG. 4, the cap member 400 includes an approximately cylindrical outer cap 400a formed at the outermost edge thereof and an approximately cylindrical inner cap 400b formed inside the outer cap 400a.

The inner cap 400b has a cylindrical coupling part 410 formed therein, and a plurality of reinforcement ribs 400c are radially connected between the inner cap 400b and the coupling part 410.

The coupling structure 500 applied to the suspension for a vehicle in accordance with the embodiment of the present disclosure includes two or more fixed pieces 510 which are formed in the cylindrical coupling part 410 formed in the inner center of the cap member 400 and pressurize and fix the circumference of the upper end of the strut rod 200. The circumference of the upper end of the strut rod 200 is forcibly coupled between the fixed pieces 510.

As illustrated in FIG. 4, three fixed pieces 510 may be installed in the coupling part 410, and disposed on the circumference of a concentric circle in the coupling part 410. Therefore, when the three fixed pieces 510 are connected, one circle is formed. Furthermore, the fixed pieces 510 are disposed at even intervals.

In order that the circumference of the upper end of the strut rod 200 is forcibly coupled between the fixed pieces 510, a groove formed by the fixed pieces 510 has a smaller radius by a length T than the radius of the strut rod 200.

The suspension for a vehicle in accordance with the embodiment of the present disclosure may further include an anti-rotation structure 600 formed in the cap member 400 and the upper cup 330.

The anti-rotation structure 600 includes one or more fixed grooves 331 formed in the upper cup 330 and one or more fixed protrusions 420 formed on the cap member 400.

When the cap member 400 is fixed to the upper cup 330, the fixed protrusions 420 formed on the cap member 400 are inserted into the fixed grooves 331 formed in the upper cup 330, which makes it possible to prevent rotation of the cap member 400 by vibration of the vehicle or the like, after the cap member 400 is coupled. When the cap member 400 is rotated, the cap member 400 may be easily separated.

The suspension for a vehicle in accordance with the embodiment of the present disclosure may further include an anti-separation structure formed in the cap member 400 and the upper cup 330.

The anti-separation structure includes a first crease structure 332 formed in a ring shape in the upper cup 330 and a second crease structure 411 formed on the outer surface of the coupling part 410 and coupled to the first crease structure 332.

When the cap member 400 is fixed to the upper cup 330, a second crease structure 411 formed in the coupling part 410 of the cap member 400 is reliably fixed to a first crease structure 332 formed in a ring shape along the inner surface of the groove formed in the upper cup 330, which makes it possible to prevent the separation of the cap member 400 from the upper cup 330 by vibration of the vehicle or the like after the cap member 400 is coupled.

In accordance with the above-described embodiment of the present disclosure, the coupling structure coupled to the upper end of the strut rod may be formed in the cap member, which makes it possible to improve the coupling force of the cap member. Furthermore, the anti-rotation structure may be formed in the upper cup and the cap member, which makes it possible to prevent the rotation of the cap member. Furthermore, the anti-separation structure may be formed in the upper cup and the cap member, which makes it possible to prevent the separation of the cap member.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A suspension for a vehicle, comprising:
a strut tube;
a strut rod movably installed in the strut tube;
an insulator part through which an upper end of the strut rod is installed, the insulator part comprising a lower cup, an insulator body, and an upper cup; and
a cap member coupled to the upper cup so as to prevent penetration of foreign matters, and including a coupling structure coupled to the upper end of the strut rod,
wherein:
the cap member and the upper cup include an anti-rotation structure for preventing rotation of the cap member; and
the anti-rotation structure comprises a plurality of fixed grooves formed in the upper cup and a plurality of fixed protrusions formed in the cap member.

2. The suspension of claim 1, wherein the coupling structure comprises a plurality of fixed pieces formed in a cylindrical coupling part formed in an inner central portion of the cap member, the plurality of fixed pieces being configured to pressurize and fix the circumference of the upper end of the strut rod, and the circumference of the upper end of the strut rod is forcibly coupled between the fixed pieces.

3. The suspension of claim 2, wherein the plurality of fixed pieces are disposed on the circumference of a concentric circle, and arranged at even intervals.

4. The suspension of claim 2, wherein a groove formed by the plurality of fixed pieces has a smaller radius than that of the strut rod.

5. The suspension of claim 1, wherein the cap member and the upper cup include an anti-separation structure for preventing separation of the cap member.

6. A suspension for a vehicle, comprising:
a strut tube;
a strut rod movably installed in the strut tube;
an insulator part through which an upper end of the strut rod is installed, the insulator part comprising a lower cup, an insulator body, and an upper cup; and
a cap member coupled to the upper cup so as to prevent penetration of foreign matters, and including a coupling structure coupled to the upper end of the strut rod,
wherein:
the cap member and the upper cup include an anti-separation structure for preventing separation of the cap member;
the cap member and the upper cup include an anti-rotation structure for preventing rotation of the cap member; and
the anti-rotation structure comprises a plurality of fixed grooves formed in the upper cup and a plurality of fixed protrusions formed in the cap member.

7. The suspension of claim 6, wherein the coupling structure comprises a plurality of fixed pieces which are formed in a cylindrical coupling part formed in an inner central portion of the cap member, the plurality of fixed pieces being configured to pressurize and fix the circumference of the upper end of the strut rod, and the circumference of the upper end of the strut rod is forcibly coupled between the fixed pieces.

8. The suspension of claim 7, wherein the plurality of fixed pieces are disposed on the circumference of a concentric circle, and arranged at even intervals.

9. The suspension of claim 7, wherein a groove formed by the plurality of fixed pieces has a smaller radius than that of the strut rod.

10. The suspension of claim 6, wherein the anti-separation structure comprises a first crease structure formed in a ring-shape in the upper cup and a second crease structure formed on the outer surface of the coupling part and coupled to the first crease structure.

* * * * *